(12) United States Patent
Nakhjavani

(10) Patent No.: US 11,847,577 B2
(45) Date of Patent: Dec. 19, 2023

(54) AUXILIARY POWER UNIT USAGE PREDICTION

(71) Applicant: THE BOEING COMPANY, Chicago, IL (US)

(72) Inventor: Omid B. Nakhjavani, Kirkland, WA (US)

(73) Assignee: THE BOEING COMPANY, Arlington, VA (US)

( * ) Notice: Subject to any disclaimer, the term of this patent is extended or adjusted under 35 U.S.C. 154(b) by 272 days.

(21) Appl. No.: 16/858,003

(22) Filed: Apr. 24, 2020

(65) Prior Publication Data

US 2021/0334675 A1 Oct. 28, 2021

(51) Int. Cl.
*G06N 5/04* (2023.01)
*G06Q 10/20* (2023.01)
*G06N 20/00* (2019.01)
*G06Q 10/1093* (2023.01)

(52) U.S. Cl.
CPC .............. *G06N 5/04* (2013.01); *G06N 20/00* (2019.01); *G06Q 10/20* (2013.01); *G06Q 10/1097* (2013.01)

(58) Field of Classification Search
CPC ....................................................... G06N 5/04
See application file for complete search history.

(56) References Cited

U.S. PATENT DOCUMENTS 6,296,957 B1 * 10/2001 Graage ................... H01M 8/00
429/513
7,702,435 B2 * 4/2010 Pereira ................ H04L 41/0866
701/30.8
8,444,093 B1 * 5/2013 Epstein .................. B64D 15/02
244/134 B
2006/0126608 A1 * 6/2006 Pereira ................ H04L 41/0866
370/360
2012/0041627 A1 * 2/2012 Kelty .................. B60L 15/2045
701/22

(Continued)

FOREIGN PATENT DOCUMENTS

EP          2323005 A1 *  5/2011  ......... G05B 23/0251
WO  WO-2015029332 A2 *  3/2015  .......... B60L 11/1868

OTHER PUBLICATIONS

Eduardo Moreno Gallart, Design of Auxiliary Power Unit (APU) for co-operation with a turboshaft engine, Technical University of Lodz, International Faculty of Engineering Institute of Turbomachinery Lodz, 2013. (Year: 2013).*

(Continued)

*Primary Examiner* — Kurtis Gills
(74) *Attorney, Agent, or Firm* — Moore IP Law

(57) ABSTRACT

A system includes a machine-learning device configured to receive data associated with an aircraft. The data includes a flying time associated with one or more flight phases of travel to a destination airport, temperature data associated with one or more of the flight phases, and a number of occupants on board the aircraft. The machine-learning device is configured to process the data to generate prediction data regarding usage of an auxiliary power unit of the aircraft and to generate a message based on the prediction data. The message indicates at least one of an estimated number of on/off events of the auxiliary power unit or an estimated duration of use of the auxiliary power unit.

20 Claims, 5 Drawing Sheets

(56) References Cited

U.S. PATENT DOCUMENTS

| | | | | |
|---|---|---|---|---|
| 2014/0203136 A1* | 7/2014 | Endres | ............... | B64F 1/002 |
| | | | | 244/50 |
| 2015/0158397 A1* | 6/2015 | Soto | ............... | B60L 15/2009 |
| | | | | 903/903 |
| 2015/0279218 A1* | 10/2015 | Irrgang | ............ | G07C 5/0816 |
| | | | | 701/3 |
| 2016/0111885 A1* | 4/2016 | Roques | ............. | H01H 33/02 |
| | | | | 29/428 |
| 2016/0181641 A1* | 6/2016 | Hoffjann | ......... | H01M 8/1007 |
| | | | | 429/8 |
| 2016/0264252 A1* | 9/2016 | Rideau | ........... | F04C 18/0215 |
| 2018/0126851 A1* | 5/2018 | Koebler | ............ | B60L 7/12 |
| 2019/0283600 A1* | 9/2019 | Koebler | ......... | G01C 21/3617 |
| 2020/0277080 A1* | 9/2020 | Wiegman | ........... | B60L 50/60 |

OTHER PUBLICATIONS

U.S. Appl. No. 16/428,768, filed May 31, 2019, Omid B. Nakhjavani.
U.S. Appl. No. 16/858,003, filed Apr. 24, 2020, Nakhjavani.

\* cited by examiner

AUXILIARY POWER UNIT USAGE PREDICTION

FIELD OF THE DISCLOSURE

The present disclosure is generally related to auxiliary power units.

BACKGROUND

Commercial aircraft typically include an auxiliary power unit (APU) to provide electrical power to aircraft systems independently of operation of the aircraft's main engines. Although APUs are commonly operated to provide electrical power, such as for air conditioning and heating, while the aircraft is on the ground and the main engines are off, under various circumstances APUs are also operated during other portions of the flight (e.g., during takeoff, landing, or a cruise portion of the flight).

An APU is a complex system that requires regular maintenance for optimal operation and to ensure a longest possible operational life. Maintenance operations can be scheduled based on a variety of factors, such as how many times the APU has been activated, or the cumulative time that the APU has operated, since a previous inspection or service. However, because APU usage can vary significantly based on many disparate factors, APU usage is difficult to accurately predict.

SUMMARY

In a particular implementation, a system includes a machine-learning device configured to receive data associated with an aircraft. The data includes a flying time associated with one or more flight phases of travel to a destination airport, temperature data associated with one or more of the flight phases, and a number of occupants on board the aircraft. The machine-learning device is configured to process the data to generate prediction data regarding usage of an auxiliary power unit of the aircraft and to generate a message based on the prediction data. The message indicates at least one of an estimated number of on/off events of the auxiliary power unit or an estimated duration of use of the auxiliary power unit.

In another particular implementation, a method includes receiving, by a machine-learning device, data associated with an aircraft, including receiving a flying time associated with one or more flight phases of travel to a destination airport, receiving temperature data associated with one or more of the flight phases, and receiving a number of occupants on board the aircraft. The method includes analyzing, by the machine-learning device, the data to generate prediction data regarding usage of an auxiliary power unit of the aircraft. The method also includes generating, by the machine-learning device, a message based on the prediction data, where the message indicates at least one of an estimated number of on/off events of the auxiliary power unit or an estimated duration of use of the auxiliary power unit.

In another particular implementation, a non-transitory, computer-readable medium stores instructions that, when executed by a processor, cause the processor to initiate, perform, or control operations that predict usage of an auxiliary power unit of an aircraft. The operations include determining data including: a flying time associated with one or more flight phases of travel to a destination airport, temperature data associated with one or more of the flight phases, and a number of occupants on board the aircraft. The operations also include, based on processing the data, generating prediction data regarding usage of the auxiliary power unit. The operations also include, based on the prediction data, determining information including at least one of an estimated number of on/off events of the auxiliary power unit or an estimated duration of use of the auxiliary power unit. The information is employable to facilitate maintenance of the auxiliary power unit. In some implementations, the operations also include determining, at least partially based on the prediction, at least one of a maintenance schedule associated with the auxiliary power unit or a cost estimate associated with the auxiliary power unit.

The features, functions, and advantages described herein can be achieved independently in various implementations or may be combined in yet other implementations, further details of which can be found with reference to the following description and drawings.

DETAILED DESCRIPTION

Figure 1:
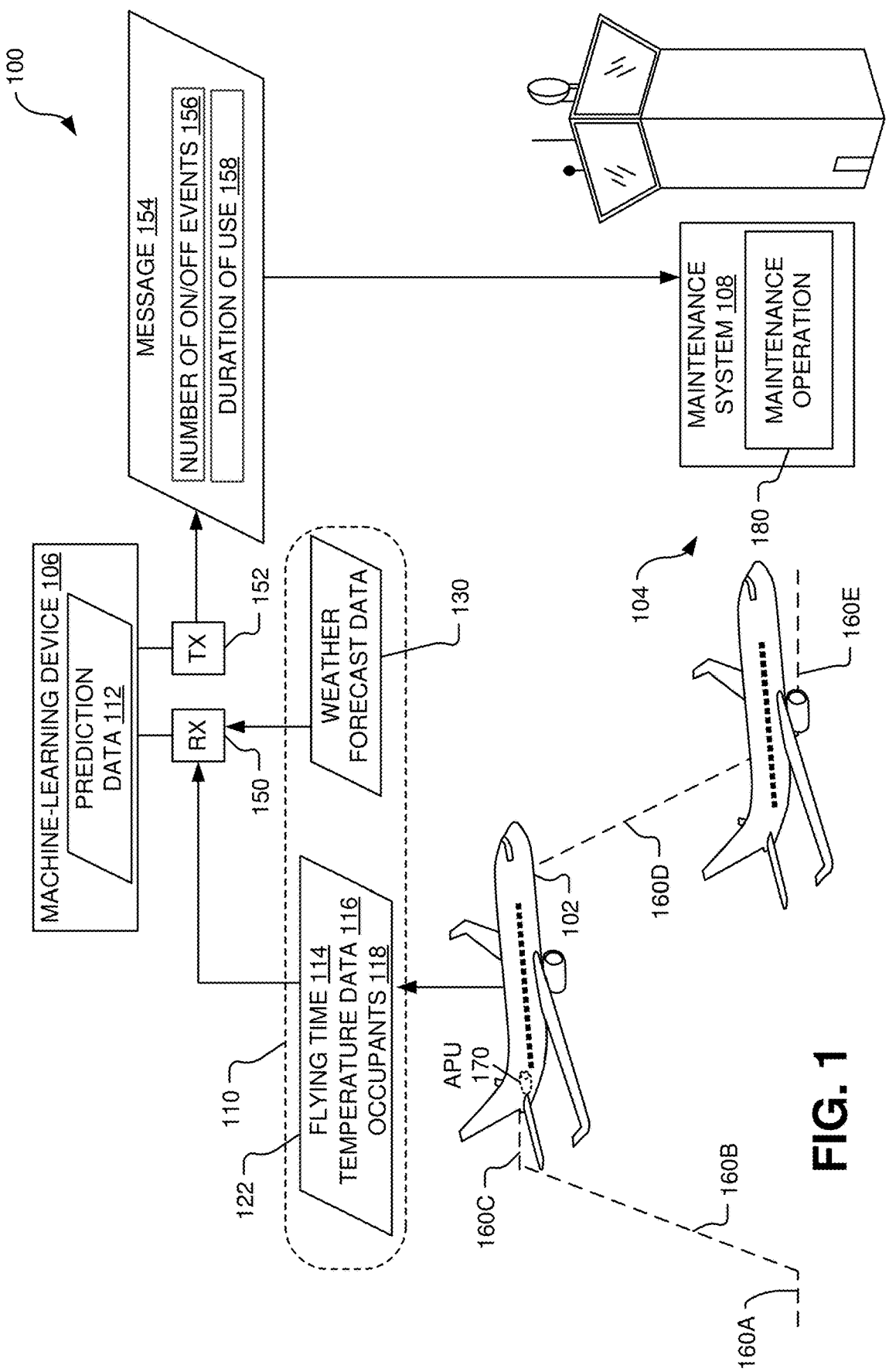
FIG. 1 is a diagram that illustrates a system configured to predict usage of an auxiliary power unit (APU) of an aircraft.

Aspects disclosed herein present systems and methods for predicting usage of an APU. Because APU usage can vary significantly based on many different factors, APU usage is difficult to accurately predict. To account for this uncertainty, maintenance operations may be scheduled earlier than would be required based on the estimated APU usage in order to ensure that the maintenance operations are performed within the recommended maintenance window. For example, if an estimate of APU usage indicates a maintenance operation is to be performed after 100 hours of operation, the maintenance operation may be scheduled to be performed when the APU reaches 90 hours of operation to accommodate the uncertainty in the estimate. Scheduling maintenance operations early means that maintenance is performed more frequently than needed, increasing labor and parts costs associated with maintaining the APU as well as increasing the aircraft's non-operational time while maintenance is ongoing.

As disclosed herein, machine learning is used to analyze data, such as aircraft sensor data, destination airport weather forecast data, and flight information, to identify combinations of factors that are correlated with APU usage. The identified factors can be used to predict APU usage, such as a number of on/off events and the cumulative operational hours of the APU during a particular flight. To illustrate, while the aircraft is in flight, available data can be processed and a message can be provided to a flight crew of the aircraft, a maintenance crew at the destination airport, or both, indicating that a maintenance operation is to be performed upon the aircraft arriving at the destination airport. The enhanced accuracy of APU estimates using the disclosed systems and methods can additionally, or alternatively, be used to improve the accuracy of other aspects, such as long-term maintenance scheduling and cost estimates associated with APU usage, such as costs associated with leasing or providing a warranty for the APU. Thus, costs and delays associated with conventional estimates of APU usage can be reduced or avoided.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple phases of a flight 160 are illustrated and associated with reference numbers 160A, 160B, 160C, 160D, and 160E. When referring to a particular one of these phases, such as a taxiing/takeoff phase 160A, the distinguishing letter "A" is used. However, when referring to any arbitrary one of these phases or to these phases as a group, the reference number 160 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to predict usage of an auxiliary power unit (APU) 170 of an aircraft 102. Data 110 including a flying time 114 of the aircraft 102, temperature data 116, and/or a number of occupants 118 on the aircraft 102 is processed to generate prediction data 112 regarding usage of the APU 170, and a message 154 is generated based on the prediction data 112. The message 154 indicates at least one of an estimated number of on/off events 156 of the APU 170 or an estimated duration of use 158 of the APU 170.

FIG. 1 illustrates representative portions of a flight path of the aircraft 102 to the destination airport 104. For example, the flight path includes a first phase (e.g., taxi/takeoff) 160A, a second phase (e.g., climb) 160B, a third phase (e.g., cruise) 160C, a fourth phase (e.g., descent) 160D, and a fifth phase (e.g., landing) 160E. The aircraft 102 is configured, during one or more stages of the flight 160 to the destination airport 104, to transmit aircraft-related data 122. For example, the aircraft-related data 122 can be transmitted to the system 100 for processing and estimating usage of the APU 170 for the remaining phases of the flight 160. In a particular implementation, the aircraft-related data 122 is transmitted prior to the aircraft 102 beginning the fourth flight phase 160D. The aircraft-related data 122 can include information regarding temperature or other conditions of the aircraft 102 and/or the APU 170. For example, the aircraft-related data 122 can include a flying time 114 associated with one or more of the flight phases 160A-160E of travel to the destination airport 104 and temperature data 116 associated with one or more of the flight phases 160A-160E. To illustrate, the temperature data 116 can include an inlet duct temperature, an outside temperature (e.g., current temperature measured via one or more sensors onboard the aircraft 102), one or more other measurements, or a combination thereof. The aircraft-related data 122 can also include the number of occupants 118 on the aircraft. The number of occupants 118 includes the number of passengers on the aircraft 102, and in some implementations, the number of occupants 118 also includes the number of crew. The aircraft-related data 122 can also include additional information such as animals in the cargo hold and/or other heat sources onboard the aircraft 102. Further detail with regard to the aircraft-related data 122 are provided with reference to FIG. 2.

The system 100 includes a machine-learning device 106 coupled to a receiver 150 ("RX" in FIG. 1) and to a transmitter 152 ("TX" in FIG. 1). The machine-learning device 106 is configured to receive the data 110, including the aircraft-related data 122 and weather forecast data 130 of the destination airport 104. For example, the weather forecast data 130 can be transmitted from the destination airport 104 or can be generated by a weather forecasting service remote from the destination airport 104. The weather forecast data 130 indicates one or more weather conditions that are forecast to be present at one or more of the flight phases 160A-160E, such as at the destination airport 104 at the time of arrival of the aircraft 102. Examples of weather forecast data 130 are described further with reference to FIG. 2.

The machine-learning device 106 is configured to process the data 110 to generate the prediction data 112 regarding predicted usage of the APU 170. In some implementations, the machine-learning device 106 is configured to generate the prediction data 112 prior to an arrival of the aircraft 102 at the destination airport 104. The machine-learning device 106 can include a regression model that is configured to process the data 110 to generate an output that indicates an estimated usage of the APU 170 during the remainder of the flight, including after landing at the destination airport 104.

The machine-learning device 106 is configured to generate the message 154 based on the prediction data 112. The message 154 indicates at least one of an estimated number of on/off events 156 of the auxiliary power unit 170 or an estimated duration of use 158 of the auxiliary power unit 170. For example, on/off events include transitions of the APU 170 from an "off" state to an "on" state (e.g., turning the APU 170 on) and transitions of the APU 170 from the "on" state to the "off" state (e.g., turning the APU 170 off). The number of on/off events 156 can indicate a predicted number of times the APU 170 is activated, a predicted number of time the APU 170 is deactivated, or a combination thereof. The duration of use 158 indicates a predicted length of time that the APU 170 will be on. For example, in some implementations in which the APU 170 is predicted to be activated multiple times, the duration of use 158 can include multiple values, each value corresponding to a predicted length of time that the APU 170 will be used after each predicted activation of the APU 170. In other implementations in which multiple activations of the APU 170 are predicted, the duration of use 158 includes a single value that represents a total amount of time that the APU 170 is predicted to be used.

The receiver 150 is coupled to the machine-learning device 106 and configured to receive the aircraft-related data 122 and the weather forecast data 130. The transmitter 152 is coupled to the machine-learning device 106 and configured to send the message 154 to one or both of: the aircraft 102, or a maintenance system 108 at the destination airport 104. Although the system 100 is illustrated as including the receiver 150 and the transmitter 152, in other implementations the system 100 includes one or more other implementations of a receive element and a transmit element. For example, a transceiver can be coupled to the machine-learning device 106, and the transceiver can include the receiver 150 and the transmitter 152.

The message 154 can be transmitted to the aircraft 102 and can provide an indication to the flight crew that a maintenance operation 180 associated with the auxiliary power unit 170 to be performed after arrival of the aircraft 102 at the destination airport 104. To illustrate, the maintenance operation 180 can be a particular maintenance operation or type of maintenance operation that is selected or recommended, by the machine-learning device 106, to be performed. For example, the maintenance operation 180 can include inspecting or replacing one or more components of the APU 170 according to a maintenance schedule that is based on an accumulated usage time of the APU 170 (e.g., a total number of hours the APU 170 has operational since the last performance of the maintenance operation 180). As another example, the message 154 is transmitted to the maintenance system 108 at the destination airport 104. The maintenance system 108 can include one or more computers, interfaces, equipment, or a combination thereof. For example, the maintenance system 108 can include machinery configured to perform the maintenance operation 180.

During operation, data collection can begin prior to takeoff of the aircraft 102 or after the aircraft 102 is airborne. Flight data, such as flight origin, destination, number of passengers, estimated flying time, etc., may be recorded prior to the flight 160 or generated during the flight 160. Sensor data, such as the temperature data 116, are collected during the flight 160. In addition, the weather forecast data 130 at the destination airport 104 and/or at a phase or most any location on the flight path is collected. For example, the weather forecast data 130 can include temperature, relative humidity, dew point, air pressure, wind speed, airborne particulate matter counts (such as sand, ash, or pollen counts), etc. The weather forecast data 130 can be collected from external data stores and/or web servers, as illustrative, non-limiting examples. The flight data, the sensor data, and the weather forecast data 130 are received at the receiver 150 and input to the machine-learning device 106. The machine-learning device 106 generates prediction data 112 of usage of the APU 170 throughout the remainder of the flight 160, in some implementations. The prediction data 112 can be processed at the machine-learning device 106 to generate the message 154 that is transmitted by the transmitter 152.

The machine-learning device 106 is trained to predict APU usage based on a variety of factors. To illustrate, because passengers in the aircraft 102 function as a source of heat, having more passengers can reduce the amount of heating used to maintain the temperature in the cabin of the aircraft 102 in colder environments, reducing APU usage, or can increase the amount of air conditioning used to maintain the cabin temperature in warmer environments, increasing APU usage. However, the relationship between number of passengers, outside air temperature, and APU usage is complex and not as simplistic as in the above example. Further, additional factors can be used to improve the prediction data 112, such as the length of each flight phase 160A-160E, how quickly the aircraft 102 climbs during takeoff, how quickly the aircraft 102 descends during landing, outside temperature during flight (and how long the aircraft 102 is exposed to that temperature), outside temperature at the destination airport at the time of landing, how long the aircraft is on the ground at the originating airport, how long the aircraft will be on the ground at the destination airport, weather conditions at the destination airport, such as temperature, humidity, and the amount of particular matter (e.g., sand, smog, or ash) in the air at the destination airport, and originating and destination airport locations, as illustrative, non-limiting examples.

The message 154 can be an automated alert that uses rule-based logic to determine that the maintenance operation 180 is to be performed. For example, preventative or corrective maintenance for the APU 170 can be performed at the maintenance system 108. As another example, the message 154 can be sent as an alert to the aircraft 102 to alert the flight crew or onboard systems of the aircraft 102 that the maintenance operation 180 is to be performed while the aircraft 102 is at the destination airport 104.

The aircraft 102, the machine-learning device 106, the receiver 150, the transmitter 152, and the maintenance system 108 are interconnected via one or more networks to enable data communications. For example, the machine-learning device 106 is coupled to the maintenance system 108 via one or more wireless networks, one or more wireline networks, or any combination thereof. Two or more of the machine-learning device 106, the receiver 150, the transmitter 152, and the maintenance system 108 can be co-located or geographically distributed from each other.

The machine-learning device 106 can be implemented at least in part by a processor executing instructions to perform the described functions, as described further with reference to FIGS. 2-5. The processor of the machine-learning device 106 can be implemented as a single processor or as multiple processors, such as in a multi-core configuration, a multi-processor configuration, a distributed computing configuration, a cloud computing configuration, or any combination thereof. In some implementations, one or more portions of the machine-learning device 106 are implemented using dedicated hardware, firmware, or a combination thereof.

By predicting usage of the APU 170 during the flight 160, one or more preventive actions can be performed regarding the APU 170, such as scheduling the maintenance operation 180. As a result, more accurate scheduling of maintenance for the APU 170 is enabled based on actual flight conditions as compared to based solely on flight distance. Improved accuracy of maintenance scheduling can improve performance and extend the operational life of the APU 170.

Although FIG. 1 illustrates particular examples for clarity of explanation, such examples are not to be considered as limitations. For example, although FIG. 1 depicts generating the prediction data 112 during the flight 160 to the destination airport 104 and providing the flight crew, the maintenance crew, or both, with advance notice that the maintenance operation 180 is to be performed, in other implementations the prediction data 112 can be generated prior to initiating the flight 160. To illustrate, the prediction data 112 can be generated as part of generating a maintenance schedule for the aircraft 102 or for the APU 170 based on a schedule of upcoming flights for the aircraft 102, or as part of estimating future costs associated with operation of the APU 170, as described further with reference to FIG. 2.

Although the data 110 is described as including the flying time 114, the temperature data 116, the number of occupants 118, and the weather forecast data 130, in other implementations the data 110 includes fewer types of data, such as by omitting the weather forecast data 130, or includes one or more other types of data in addition to, or in place of, one or more of the flying time 114, the temperature data 116, the number of occupants 118, or the weather forecast data 130. For example, in some implementations additional sensor data, such as air speed, heating and cooling system activity aboard the aircraft 102, and measurements of electrical power output by the APU 170 can be included in the data 110 to enable the machine-learning device 106 to more accurately predict APU usage.

Although the machine-learning device 106 and the aircraft 102 are depicted as separate components, in other implementations the machine-learning device 106 can be integrated into the aircraft 102. For example, although having the machine-learning device 106 as a dedicated system remote from the aircraft 102 enables the machine-learning device 106 to operate as a central information hub with larger available computational resources and power consumption than may be available in an airplane-based system, in other implementations computations associated with generating the prediction data 112 can be performed at the aircraft 102. In other implementations, the machine-learning device 106 can be integrated in the maintenance system 108 or another system at the destination airport 104.

Figure 2:
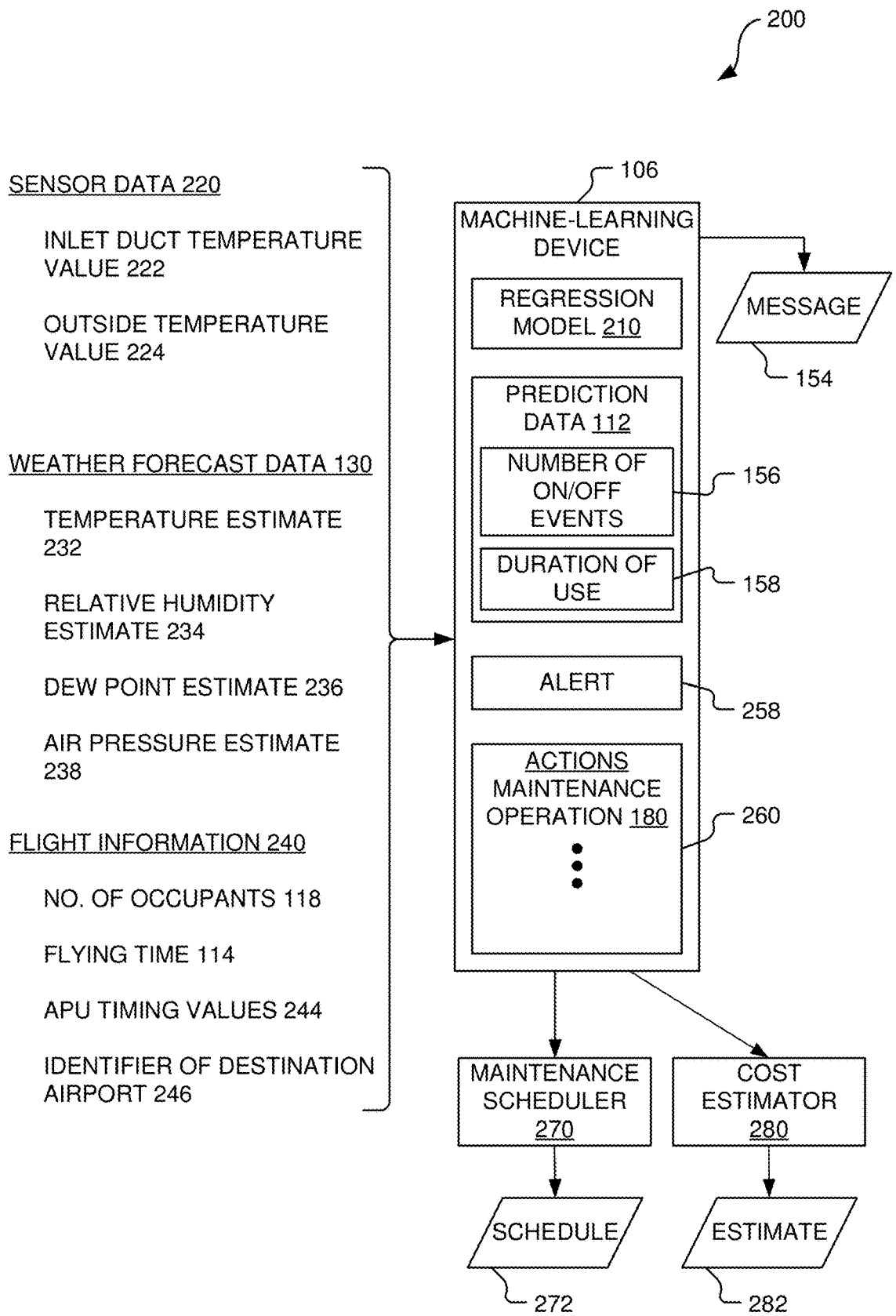
FIG. 2 is a diagram of a particular implementation of components that can be implemented in the system of FIG. 1.

FIG. 2 illustrates a particular implementation 200 of components of the system 100 including the machine-learning device 106. The machine-learning device 106 is configured to receive various types of data, including sensor data 220 of the aircraft 102, the weather forecast data 130, and flight information 240. The sensor data 220 includes data that is determined to be pertinent to predicting usage of the APU 170, according to some examples, such as one or more of: an inlet duct temperature value 222; an outside temperature value 224; or one or more other sensor measurements, such as from an environmental control system. The sensor data 120 can be collected for each of the flight phases 160A-160E to provide data indicating a time-evolution of sensor measurements over the duration of the flight 160.

The weather forecast data 130 includes data that is determined to be pertinent to predicting usage of the APU 170, according to some examples. As illustrated, the weather forecast data 130 includes one or more of: a temperature estimate 232; a relative humidity estimate 234; a dew point estimate 236; or an air pressure estimate 238 of the destination airport 104.

The flight information 240 includes one or more of: the number of occupants 118 predicted to be, or determined to be, on the aircraft 102, the flying time 114 associated with one or more flight phases 160 of travel to the destination airport 104; timing values 244 of APU on/off events during one or more of, or each of, the flight phases 160; or an identifier 246 of the destination airport 104. To illustrate, the flying time 114 can include an estimated time from departure from an origination airport to takeoff, an estimated time from departure to landing, an estimated time from landing to taxi at the destination airport 104, one or more other estimated or measured time, or any combination thereof.

The machine-learning device 106 includes a regression model 210 configured to generate the prediction data 112. The regression model 210 can be generated based on results of a machine-learning procedure that can include providing training data to the machine-learning device 106 to train the regression model 210 to accurately predict error conditions associated with sets of the training data. In some implementations, the regression model 210 can include a random forest technique, a logistic regression technique, a support vector machine, a K-nearest neighbors regression technique, one or more other techniques, or any combination thereof. A cross-validation procedure, such as 10-fold cross-validation, can be performed to verify that the outcomes (e.g., predictions) of the machine-learning model are reliable. In an example, input data sets that include flight information (e.g., passenger numbers), sensor data (e.g., temperatures), and weather forecast at the destination airport can be divided into training sets and test sets. The training sets are used to train the machine-learning model, and the test sets are used for validation of the trained machine-learning model.

Because some occurrences of APU usage (e.g., in-flight operation of the APU 170) are rare, the input data sets can tend to be unbalanced. To illustrate, a representative sample of actual flights includes far more training sets in which an APU is both activated and deactivated while the aircraft is on the ground (denoted as "GG" usage) as compared to both activation and deactivation while the aircraft is in the air ("AA" usage), activation while on the ground and deactivation while in the air ("GA" usage), and activation while in the air and deactivation while on the ground ("AG" usage). Oversampling of the training sets that include AA, GA, and AG usage can be applied to balance training data.

Training the regression model 210 can include tuning the model parameters and training the regression model 210 using training data sets. After training the regression model 210, the testing data sets can be used to measure model performance. Analyzing the model performance can include determining accuracy, precision, and recall. Accuracy can be determined as an area under a receiver operating characteristic (ROC) curve. Precision can be determined based on a number of error conditions that were predicted correctly. Recall can be determined based on how many error conditions occurring in the testing data sets are predicted by the regression model 210.

In some implementations, the regression model 210 is configured to generate the prediction data 112 including the number of on/off events 156, the duration of use 158, or both. The number of on/off events 156 is a discrete value (e.g., one, two, three, etc.), and the duration of use 158 is a continuous value (e.g., a calculated duration). In some implementations, the machine-learning device 106 generates an alert 258 that is included in the message 154 sent to the maintenance system 108, sent to the aircraft 102, or both. In some implementations, the machine-learning device 106 selects from one or actions 260 to be included as a recommended action in the message 154. For example, the actions 260 can include scheduling performance of the maintenance operation 180, scheduling one or more maintenance operations, or a combination thereof.

In some implementations, the prediction data 112 indicates an estimate of when the maintenance operation 180 will be needed or should be scheduled. In other implementations, the prediction data 112 omits estimates related to timing of the maintenance operation 180 and instead indicates a predicted number of on/off events 156, the duration of use 158, or both.

In some implementations, the machine-learning device 106 provides the prediction data 112 or the message 154 to a maintenance scheduler 270, to a cost estimator 280, or both. For example, the machine-learning device 106 may be used to predict APU usage over multiple upcoming flights of the aircraft 102, such as to generate a 1-month forecast for usage of the APU 170, a 3-month forecast, a one-year forecast, or a forecast for any other time period, based on planned flights for the aircraft 102 over the time period, including predicted or historical values of the temperature data 116, the flying time 114, and the number of occupants 118 for the planned flights.

In some implementations, the maintenance scheduler 270 is configured to determine a maintenance schedule 272 associated with the auxiliary power unit 170 at least partially based on the prediction data 112 (e.g., by generating a forecast for usage of the APU 170) to plan future maintenance of the APU 170. For example, the maintenance operation 180 may be determined by a manufacturer of the APU to be performed after every N cumulative hours of APU usage, where N is a positive number. The maintenance scheduler 270 can determine an estimated date at which the APU 170 is predicted to have been used for N cumulative hours since the last performance of the maintenance operation 180 and can schedule the maintenance operation 180 for that date in the maintenance schedule 272.

In some implementations, the cost estimator 280 is configured to determine a cost estimate 282 associated with the auxiliary power unit 170 at least partially based on the prediction data 112. For example, in some implementations, the APU 170 is associated with a lease agreement that correlates a cost with a number of on/off events, with a duration of use, or both. As another example, in some implementations, the APU 170 is associated with a warranty agreement, and a cost associated with a warranty of the APU 170 is determined at least partially based on a forecast usage of the APU 170.

Figure 3:
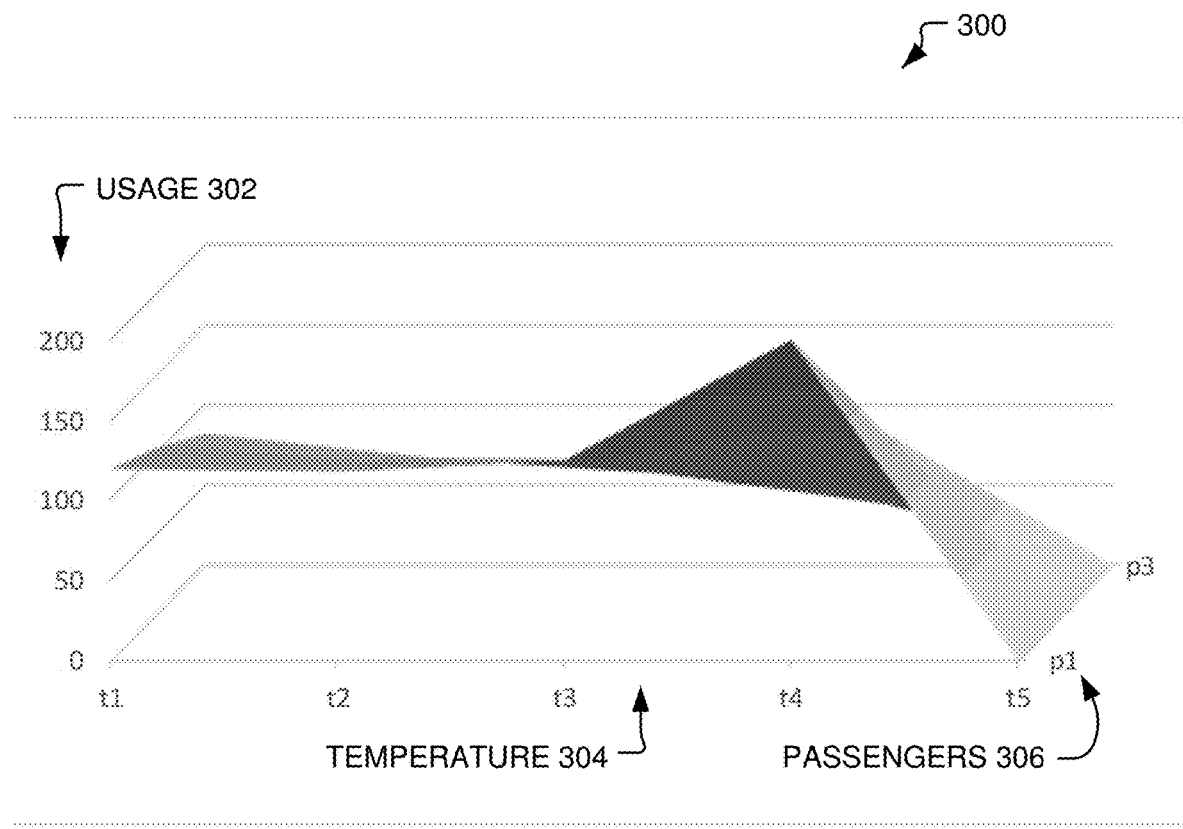
FIG. 3 is a graph showing an example of a relationship between APU usage, outside air temperature, and number of passengers.

FIG. 3 illustrates a graph 300 depicting an example of APU usage 302 (vertical axis) as a function of outside air temperature 304 (horizontal axis) and number of passengers 306 (depth axis). Each of the APU usage 302, the outside air temperature 304, and the number of passengers 306 are depicted with arbitrary units and provided for purposes of illustration rather than limitation. The graph 300 illustrates that APU usage 302 behaves non-linearly and exhibits a complex response to variation in the outside air temperature 304 and the number of passengers 306. Although the graph 300 depicts outside air temperature 304 and the number of passengers 306, other factors can contribute to APU usage, such as described in FIG. 2, resulting in additional complexity in predicting behavior of the APU 170 using simple algorithms or heuristics. Application of machine learning at the machine-learning device 106, such as via training of the regression model 210, enables enhanced accuracy of APU usage predictions based on a relatively large number of input parameters.

Figure 4:
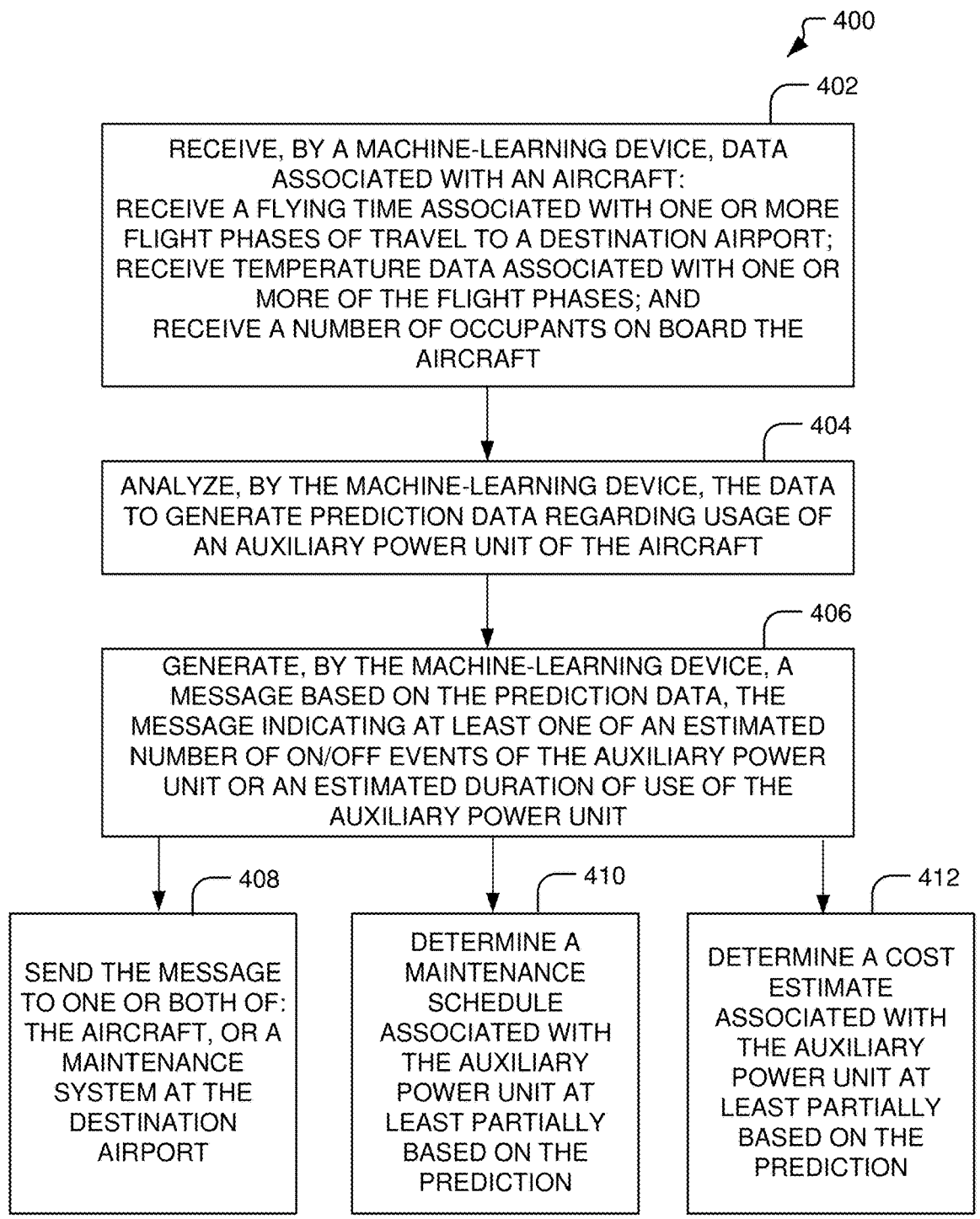
FIG. 4 is a diagram that illustrates a flow chart of an example of a method of predicting usage of an APU of an aircraft.

FIG. 4 illustrates an example of a method 400 for predicting usage of an APU of an aircraft, such as the APU 170 of the aircraft 102. The method 400 can be performed at a machine-learning device, such as the machine-learning device 106.

The method 400 includes, at block 402, receiving, by a machine-learning device, data associated with an aircraft, including: receiving a flying time associated with one or more flight phases of travel to a destination airport, receiving temperature data associated with one or more of the flight phases, and receiving a number of occupants on board the aircraft. In an example, the data 110 is received at the machine-learning device 106 and includes the flying time 114, the temperature data 116, and the number of occupants 118. In some implementations, receiving the data further includes one or more of: receiving the identifier 246 of the destination airport 104; or receiving the weather forecast data 130 of the destination airport 104. In some implementations, the temperature data corresponds to the temperature data 116 and receiving the temperature data includes one or more of: receiving the inlet duct temperature value 222; or receiving the outside temperature value 224.

The method 400 includes, at block 404, analyzing, by the machine-learning device, the data to generate prediction data regarding usage of an auxiliary power unit (170) of the aircraft. For example, the machine-learning device 106 processes the data 110 and the weather forecast data 130 to generate the prediction data 112 regarding usage of the auxiliary power unit.

The method 400 includes, at block 406, generating, by the machine-learning device, a message based on the prediction data, where the message indicates at least one of an estimated number of on/off events of the auxiliary power unit or an estimated duration of use of the auxiliary power unit. For example, the machine-learning device 106 generates the message 154 based on the prediction data 112, and the message 154 indicates the estimated number of on/off events 156, the estimated duration of use 158, or both. In some implementations, the message further indicates a maintenance operation, such as the maintenance operation 180, associated with the auxiliary power unit to be performed after arrival of the aircraft at the destination airport.

In some implementations, the method 400 includes generating the prediction data prior to an arrival of the aircraft at the destination airport, and, at block 408, sending the message to one or both of: the aircraft (e.g., to be presented to the crew via a display device); or a maintenance system (e.g., to be presented to authorized maintenance personnel via a display device) at the destination airport. In the example illustrated in FIG. 1, the machine-learning device 106 generates the prediction data 112 while the aircraft 102 is still in-flight and sends the message 154 to the aircraft 102, to the maintenance system 108, or both.

In some implementations, the method 400 includes, at block 410, determining a maintenance schedule associated with the auxiliary power unit at least partially based on the prediction data. In the example illustrated in FIG. 2, the machine-learning device 106 provides the prediction data 112 or the message 154 to the maintenance scheduler 272, which generates the maintenance schedule 272 based on the prediction data 112 (or based on the message 154, which is based on the prediction data 112). As an example, the maintenance schedule can be transmitted to the aircraft (e.g., to be presented to the crew via a display device) and/or the maintenance system e.g., to be presented to authorized maintenance personnel via a display device) at the destination airport.

In some implementations, the method 400 includes, at block 412, determining a cost estimate associated with the auxiliary power unit at least partially based on the prediction data. In the example illustrated in FIG. 2, the machine-learning device 106 provides the prediction data 112 or the message 154 to the cost estimator 280, which generates the cost estimate 282 based on the prediction data 112 (or based on the message 154, which is based on the prediction data 112). As an example, the cost estimate can be transmitted to the aircraft (e.g., to be presented to the crew via a display device) and/or the maintenance system e.g., to be presented to authorized maintenance personnel via a display device) at the destination airport.

Generating the prediction at the machine-learning device enables more accurate estimation of APU usage. The resulting enhanced accuracy of APU usage estimates can be used to improve timing of maintenance of the APU for improved overall performance, reduced costs, and extended operational life of the APU.

Figure 5:
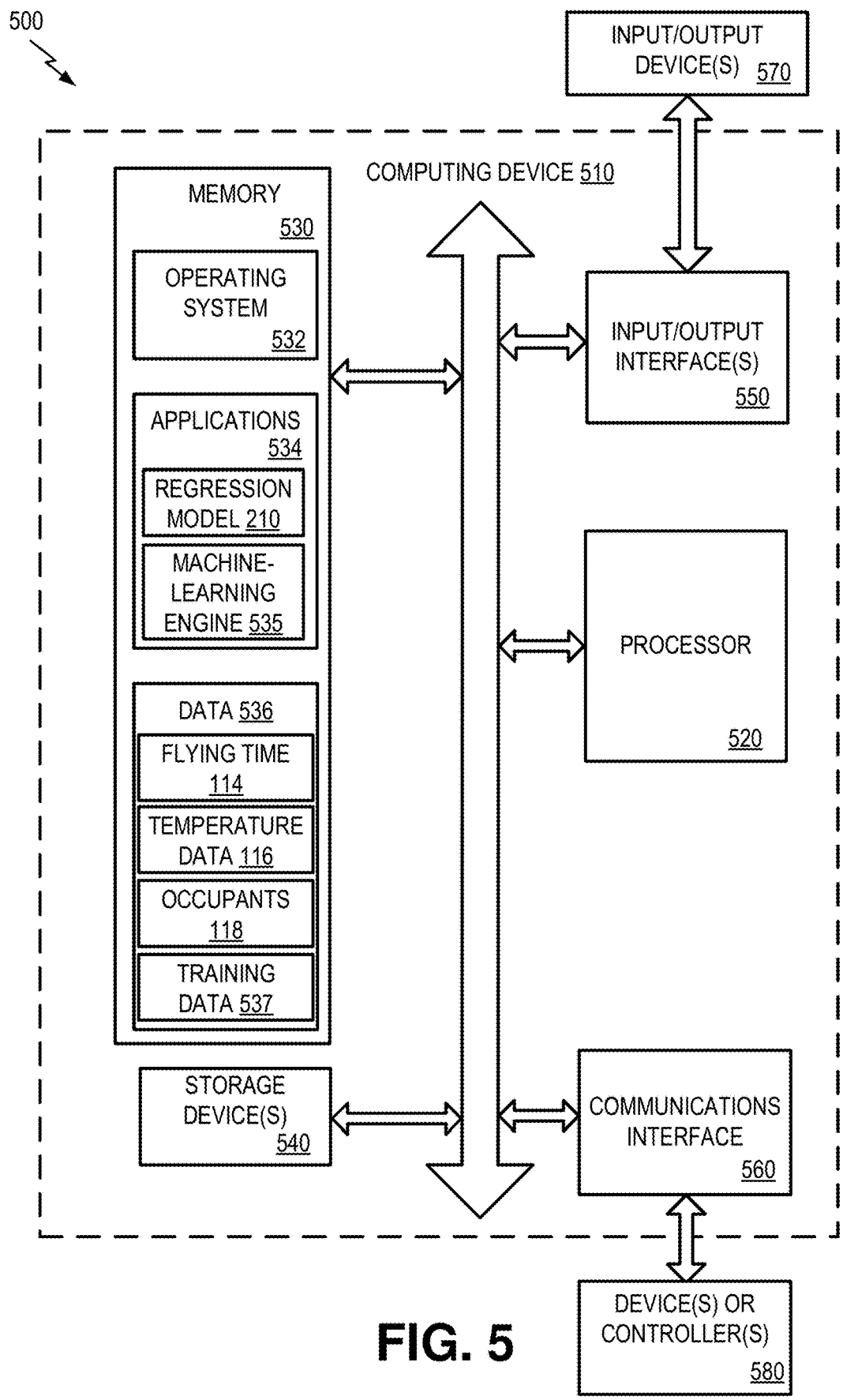
FIG. 5 is a block diagram of a computing environment including a computing device configured to support aspects of computer-implemented methods and computer-executable program instructions (or code) according to the present disclosure.

FIG. 5 is a block diagram of a computing environment 500 including a computing device 510 configured to support aspects of computer-implemented methods and computer-executable program instructions (or code) according to the present disclosure. For example, the computing device 510, or portions thereof, is configured to execute instructions to initiate, perform, or control one or more operations described with reference to FIGS. 1-4. In some implementations, the computing device 510 includes components of the machine-learning device 106. For example, the computing environment 500 can correspond to the system 100 of FIG. 1.

The computing device 510 includes one or more processors 520. The processor(s) 520 are configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which may include a basic input/output system for booting the computing device 510 as well as a full operating system to enable the computing device 510 to interact with users, other programs, and other devices. The system memory 530 stores data 536, such as the flying time 114, the temperature data 116, the number of occupants 118, or a combination thereof. The stored data 536 also includes training data 537 that can be used by a machine-learning engine 535 to generate and update the regression model 210. For example, the training data 537 can include sensor data, flight information data, and weather forecast data associated with occurrences of APU on/off events and duration of APU usage and can be processed by the machine-learning engine 535 to generate or train the regression model 210, such as in a random forest implementation, a logistic regression implementation, a support vector machine implementation, a K-nearest neighbors regression implementation, one or more implementations, or any combination thereof.

The system memory 530 includes one or more applications 534 (e.g., sets of instructions) executable by the processor(s) 520. As an example, the one or more applications 534 include instructions executable by the processor(s) 520 to initiate, control, or perform one or more operations described with reference to FIGS. 1-4. To illustrate, the one or more applications 534 include instructions executable by the processor(s) 520 to initiate, control, or perform one or more operations described with reference to the machine-learning device 106, such as the regression model 210, the machine-learning engine 535, or a combination thereof.

In a particular implementation, the system memory 530 includes a non-transitory, computer-readable medium storing the instructions that, when executed by the processor(s) 520, cause the processor(s) 520 to initiate, perform, or control operations to predict a startup condition of an auxiliary power unit of an aircraft. The operations include receiving, at a machine-learning device, data including: a flying time associated with one or more flight phases of travel to a destination airport, temperature data associated with one or more of the flight phases, and a number of passengers. The operations also include processing, at the machine-learning device, the data to generate a prediction regarding usage of the auxiliary power unit and generating, at the machine-learning device, a message based on the prediction. The message indicates at least one of an estimated number of on/off events of the auxiliary power unit or an estimated duration of use of the auxiliary power unit. In some implementations, the operations also include determining, at least partially based on the prediction, at least one of a maintenance schedule associated with the auxiliary power unit or a cost estimate associated with the auxiliary power unit.

The one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, or both. The processor(s) 520 are configured to communicate with devices or controllers 580 via the one or more communications interfaces 560. For example, the one or more communications interfaces 560 can include a network interface. The devices or controllers 580 can include, for example, the receiver 150, the transmitter 152, one or more other devices, or any combination thereof.

In conjunction with the described systems and methods, an apparatus to predict usage of an auxiliary power unit of an aircraft is disclosed that includes means for receiving data including a flying time associated with one or more flight phases of travel to a destination airport, temperature data associated with one or more of the flight phases, and a number of passengers. In some implementations, the means for receiving data corresponds to the receiver 150, the machine-learning device 106, the communications interface 560, the computing device 510, the processor(s) 520, one or more other circuits or devices configured to receive data including sensor data of the aircraft and weather forecast data of a destination airport, or a combination thereof.

The apparatus includes means for processing the data to generate a prediction regarding usage of the auxiliary power unit. For example, the means for processing the data to generate a prediction can correspond to the machine-learning device 106, the computing device 410, the processor(s) 420, one or more other devices configured to process the data to generate a prediction regarding the startup condition, or a combination thereof.

The apparatus includes means for sending, to at least one of: the aircraft or a maintenance system at the destination airport, a message based on the prediction, the message indicating at least one of an estimated number of on/off events of the auxiliary power unit or an estimated duration of use of the auxiliary power unit. In some implementations, the means for sending the message corresponds to the transmitter 152, the machine-learning device 106, the communications interface 460, the computing device 410, the processor(s) 420, one or more other circuits or devices configured to send, to at least one of: the aircraft or a maintenance system at the destination airport, a message based on the prediction and indicating at least one of an estimated number of on/off events of the auxiliary power unit or an estimated duration of use of the auxiliary power unit.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-4. To illustrate, the instructions of the applications 534, when executed by the processor(s) 520, can cause the processor(s) 520 to initiate, perform, or control operations to predict usage of an APU of an aircraft. The operations include receiving, at a machine-learning device, data including: a flying time associated with one or more flight phases of travel to a destination airport, temperature data associated with one or more of the flight phases, and a number of passengers. The operations also include processing, at the machine-learning device, the data to generate a prediction regarding usage of the auxiliary power unit and generating, at the machine-learning device, a message based on the prediction. The message indicates at least one of an estimated number of on/off events of the auxiliary power unit or an estimated duration of use of the auxiliary power unit. In some implementations, the operations also include determining, at least partially based on the prediction, at least one of a maintenance schedule associated with the auxiliary power unit or a cost estimate associated with the auxiliary power unit. In some implementations, part or all of one or more of the operations or methods of FIGS. 1-4 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Further, the disclosure comprises embodiments according to the following clauses:

Clause 1. A system, comprising:
a machine-learning device (106) configured to:
  receive data (110) associated with an aircraft, comprising:
    a flying time (114) associated with one or more flight phases (160A-160E) of travel to a destination airport (104);
    temperature data (116) associated with one or more of the flight phases (160A-160E); and
    a number of occupants (118) on board the aircraft; and
  process the data (110) to generate prediction data (112) regarding usage of an auxiliary power unit (170) of the aircraft; and
  generate a message (154) based on the prediction data (112), wherein the message (154) indicates at least one of an estimated number of on/off events (156) of the auxiliary power unit (170) or an estimated duration of use (158) of the auxiliary power unit (170).

Clause 2. The system of clause 1, wherein the data (110) further comprises one or more of:
  an identifier (246) of the destination airport (104); or
  weather forecast data (130) of the destination airport (104).

Clause 3. The system of clause 2, wherein the weather forecast data (130) comprises one or more of:
  a temperature estimate (232);
  a relative humidity estimate (234);
  a dew point estimate (236); or
  an air pressure estimate (238).

Clause 4. The system of any of clauses 1 to 3, wherein the temperature data (116) comprises one or more of:
  an inlet duct temperature value (222); or
  an outside temperature value (224).

Clause 5. The system of any of clauses 1 to 4, wherein the machine-learning device (106) is configured to generate the prediction data (112) prior to an arrival of the aircraft (102) at the destination airport (104).

Clause 6. The system of any of clauses 1 to 5, further comprising:
  a receiver (150) coupled to the machine-learning device (106) and configured to receive the data (110), the data (110) further comprising weather forecast data (130) of the destination airport (104); and a transmitter (152) coupled to the machine-learning device (106) and configured to send the message (154) to one or both of:

the aircraft (102); or a maintenance system (108) at the destination airport (104).

Clause 7. The system of any of clauses 1 to 6, wherein the message (154) further indicates a maintenance operation (180) associated with the auxiliary power unit (170) to be performed after arrival of the aircraft (102) at the destination airport (104).

Clause 8. The system of clauses 1 to 7, further comprising a maintenance scheduler (270) configured to determine a maintenance schedule (272) associated with the auxiliary power unit (170) at least partially based on the prediction data (112).

Clause 9. The system of any of clauses 1 to 8, further comprising a cost estimator (280) configured to determine a cost estimate (282) associated with the auxiliary power unit (170) at least partially based on the prediction data (112).

Clause 10. The system of any of clauses 1 to 9, where the machine-learning device (106) is included within the aircraft (102).

Clause 11. A method (400), comprising:

receiving (402), by a machine-learning device (106), data (110) associated with an aircraft, comprising:

receiving a flying time (114) associated with one or more flight phases (160A-160E) of travel to a destination airport (104);

receiving temperature data (116) associated with one or more of the flight phases (160A-160E); and receiving a number of occupants (118) on board the aircraft;

analyzing (404), by the machine-learning device (106), the data (110) to generate prediction data (112) regarding usage of an auxiliary power unit (170) of the aircraft; and generating (406), by the machine-learning device (106), a message (154) based on the prediction data (112), wherein the message (154) indicates at least one of an estimated number of on/off events (156) of the auxiliary power unit (170) or an estimated duration of use (158) of the auxiliary power unit (170).

Clause 12. The method of clause 11, wherein the receiving (402) further comprises one or more of:

receiving an identifier (246) of the destination airport (104); or receiving weather forecast data (130) of the destination airport (104).

Clause 13. The method of clause 11 or clause 12, wherein the receiving the temperature data (116) comprises one or more of:

receiving an inlet duct temperature value (222); or receiving an outside temperature value (224).

Clause 14. The method of any of clauses 11 to 13, further comprising:

generating the prediction data (112) prior to an arrival of the aircraft (102) at the destination airport (104).

Clause 15. The method of any of clauses 11 to 14, further comprising sending (408) the message (154) to one or both of:

the aircraft (102); or a maintenance system (108) at the destination airport (104).

Clause 16. The method of any of clauses 11 to 15, wherein the message (154) further indicates a maintenance operation (180) associated with the auxiliary power unit (170) to be performed after arrival of the aircraft (102) at the destination airport (104).

Clause 17. The method of any of clauses 11 to 16, further comprising determining (410) a maintenance schedule (272) associated with the auxiliary power unit (170) at least partially based on the prediction data (112).

Clause 18. The method of any of clauses 11 to 17, further comprising determining (412) a cost estimate (282) associated with the auxiliary power unit (170) at least partially based on the prediction data (112).

Clause 19. A non-transitory, computer-readable medium (530) storing instructions that, when executed by a processor (520), cause the processor (520) to initiate, perform, or control operations that predict usage of an auxiliary power unit (170) of an aircraft (102), the operations comprising:

determining data (110) comprising:

a flying time (114) associated with one or more flight phases (160A-160E) of travel to a destination airport (104);

temperature data (116) associated with one or more of the flight phases (160A-160E); and a number of occupants (118) on board the aircraft;

based on processing the data (110), generating prediction data (112) regarding usage of the auxiliary power unit (170); and based on the prediction data (112), determining information comprising at least one of an estimated number of on/off events (156) of the auxiliary power unit (170) or an estimated duration of use (158) of the auxiliary power unit (170), wherein the information is employable to facilitate maintenance of the auxiliary power unit (170).

Clause 20. The non-transitory, computer readable medium of clause 19, wherein the operations further comprise determining, at least partially based on the prediction data (112), at least one of a maintenance schedule (272) associated with the auxiliary power unit (170) or a cost estimate (282) associated with the auxiliary power unit (170). The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system, comprising:
a machine-learning device configured to:
receive data associated with an aircraft, the data comprising:
a flying time associated with one or more flight phases of travel to a destination airport;
temperature data associated with the one or more flight phases, wherein the temperature data includes a current outside air temperature associated with the aircraft and an in-progress flight phase of the one or more flight phases; and
a number of occupants on board the aircraft;
process the data to generate prediction data regarding usage of an auxiliary power unit of the aircraft, wherein the prediction data is generated based on the flying time, the current outside temperature, and the number of occupants; and
generate a message based on the prediction data, wherein the message indicates at least one of an estimated number of on/off events of the auxiliary power unit or an estimated duration of use of the auxiliary power unit;
a receiver coupled to the machine-learning device and configured to receive the data, the data further comprising weather forecast data of the destination airport; and
a transmitter coupled to the machine-learning device and configured to send the message to one or both of:
the aircraft; or
a maintenance system at the destination airport.

2. The system of claim 1, wherein the data further comprises an identifier of the destination airport.

3. The system of claim 2, wherein the weather forecast data comprises a temperature estimate, a relative humidity estimate, a dew point estimate, an air pressure estimate, or a combination thereof.

4. The system of claim 1, wherein the temperature data further comprises an inlet duct temperature value.

5. The system of claim 1, wherein the machine-learning device is configured to generate the prediction data prior to an arrival of the aircraft at the destination airport.

6. The system of claim 1, wherein the temperature data further comprises particular data indicating how long the aircraft is exposed to a particular temperature.

7. The system of claim 1, wherein the message further indicates a maintenance operation associated with the auxiliary power unit to be performed after arrival of the aircraft at the destination airport.

8. The system of claim 1, further comprising a maintenance scheduler configured to determine a maintenance schedule associated with the auxiliary power unit at least partially based on the prediction data.

9. The system of claim 1, further comprising a cost estimator configured to determine a cost estimate associated with the auxiliary power unit at least partially based on the prediction data.

10. The system of claim 1, where the machine-learning device is included within the aircraft.

11. A method, comprising:
receiving, by a machine-learning device, data associated with an aircraft, the data comprising:
a flying time associated with one or more flight phases of travel to a destination airport;
temperature data associated with the one or more flight phases, wherein the temperature data includes a current outside air temperature associated with the aircraft and an in-progress flight phase of the one or more flight phases; and
a number of occupants on board the aircraft;
analyzing, by the machine-learning device, the data to generate prediction data regarding usage of an auxiliary power unit of the aircraft, wherein the prediction data is generated based on the flying time, the current outside temperature, and the number of occupants;
generating, by the machine-learning device, a message based on the prediction data, wherein the message indicates at least one of an estimated number of on/off events of the auxiliary power unit or an estimated duration of use of the auxiliary power unit;
receiving, via a receiver coupled to the machine-learning device, the data, the data further comprising weather forecast data of the destination airport; and
transmitting, via a transmitter coupled to the machine-learning device, the message to one or both of:
the aircraft; or
a maintenance system at the destination airport.

12. The method of claim 11, wherein the receiving further comprises receiving an identifier of the destination airport.

13. The method of claim 11, wherein the receiving the temperature data comprises receiving an inlet duct temperature value.

14. The method of claim 11, further comprising:
generating the prediction data prior to an arrival of the aircraft at the destination airport.

15. The method of claim 14, wherein the temperature data further comprises particular data indicating how long the aircraft is exposed to a particular temperature.

16. The method of claim 11, wherein the message further indicates a maintenance operation associated with the auxiliary power unit to be performed after arrival of the aircraft at the destination airport.

17. The method of claim 11, further comprising determining a maintenance schedule associated with the auxiliary power unit at least partially based on the prediction data.

18. The method of claim 11, further comprising determining a cost estimate associated with the auxiliary power unit at least partially based on the prediction data.

19. A non-transitory, computer-readable medium storing instructions that, when executed by a processor, cause the processor to initiate, perform, or control operations that predict usage of an auxiliary power unit of an aircraft, the operations comprising:
determining data comprising:
a flying time associated with one or more flight phases of travel to a destination airport;
temperature data associated with the one or more flight phases, wherein the temperature data includes a current outside air temperature associated with the aircraft and an in-progress flight phase of the one or more flight phases; and
a number of occupants on board the aircraft;
based on processing the data, generating prediction data regarding usage of the auxiliary power unit, wherein the prediction data is generated based on the flying time, the current outside temperature, and the number of occupants;

based on the prediction data, determining information comprising at least one of an estimated number of on/off events of the auxiliary power unit or an estimated duration of use of the auxiliary power unit, wherein the information is employable to facilitate maintenance of the auxiliary power unit;

receiving, via a receiver, the data, the data further comprising weather forecast data of the destination airport; and transmitting, via a transmitter, the information to one or both of:
the aircraft; or
a maintenance system at the destination airport.

20. The non-transitory, computer readable medium of claim 19, wherein the operations further comprise determining, at least partially based on the prediction data, at least one of a maintenance schedule associated with the auxiliary power unit or a cost estimate associated with the auxiliary power unit.

* * * * *